Nov. 14, 1933.  E. P. DEAN  1,935,081
METHOD OF RIVETING HOLLOW BODIES
Filed Feb. 3, 1933
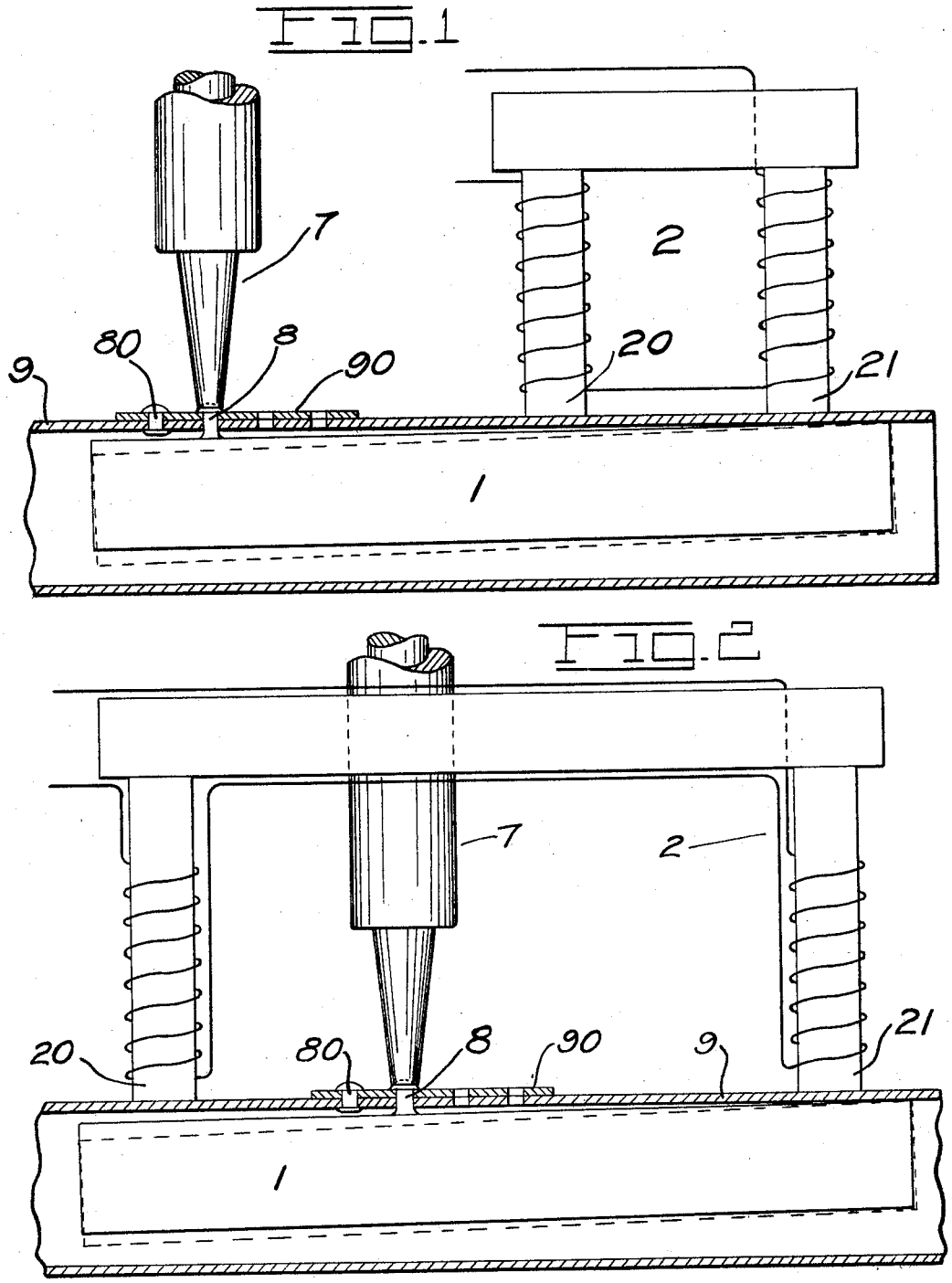
INVENTOR
Ernest P. Dean
BY
Charles L. Reynolds
ATTORNEY Patented Nov. 14, 1933

1,935,081

UNITED STATES PATENT OFFICE 1,935,081

METHOD OF RIVETING HOLLOW BODIES

Ernest P. Dean, Seattle, Wash., assignor to Boeing Airplane Company, Seattle, Wash., a corporation of Washington Application February 3, 1933. Serial No. 655,128

2 Claims. (Cl. 78—46)

My invention relates to a method of riveting, and more especially to a method whereby blind rivets, that is, rivets one end of which cannot be seen nor contacted by ordinary means, may be properly riveted over, that is, have their hidden ends upset.

The invention is particularly useful in securing members to hollow tubing, for in work of this sort the only way in which the interiorly projecting end of the rivet can be contacted directly is by cutting a hole in the opposite wall of the tubing for the insertion of a bucking-up tool, or by the employment of spring-separated weights, usually designated a mouse, such as is shown in Patent No. 1,752,799. Obviously to cut holes opposite each rivet is impractical because, for one reason, it unduly weakens the tubing, and the employment of a mouse has not proven satisfactory, since different sizes of mice are required for different sizes of tubing, and in any size the spring means employed soon crystallizes and breaks, rendering the mouse ineffective and requiring constant and recurring repairs.

It is an object of the present invention, then, to provide a method whereby these objections can be overcome, and whereby the riveting of such blind rivets is made a matter of extreme simplicity and ease, without the possibility of wearing out parts.

My invention comprises the novel method which will be hereinafter disclosed, and more particularly defined by the claims which terminate this specification.

In the accompanying drawing I have shown typical arrangements of apparatus for carrying out my method, alternative arrangements being illustrated.

Figure 1 is a cross sectional view through a hollow tube and work being riveted thereto, with apparatus for carrying out my method shown diagrammatically and in elevation, and Figure 2 is a similar view illustrating a modified arrangement.

While the invention has large value as applied to the airplane industry, for manufacture and repair work, it will also have utility in many other industries, and while I shall describe the same as applied to airplane manufacturing processes, it is to be understood that the invention is in no wise restricted to such processes, nor to any process other than such as are defined by the claims.

At 9 is illustrated a piece of hollow tubing, which may be an airplane structural member such as a longéron or a wing spar. A piece 90 is to be connected thereto, and this may represent a gusset by which a cross member is secured to the longéron. At 80 is illustrated a rivet which has already been put in place, and at 8 is a rivet in process of being headed.

For the heading process I prefer to employ a power hammer of the ordinary or any suitable type, as illustrated in general at 7. This bears upon the normal preformed head of a rivet, as is illustrated at 8 in Figure 1, which rivet has previously been inserted through holes provided in the work 9 and 90.

In order to buck up the inwardly projecting end of the rivet I employ a mass of magnetically attracted material, and since the work to be done is usually the heading of rivets within hollow tubes, this mass may take the form of a bar 1 of appreciable mass and some length. If, however, the work consisted of heading a rivet projecting within the end of a space other than that within a tube, in other words, a less restricted space, the mass, corresponding to the bar 1, need not be in bar form. It is sufficient that it be a mass of such inertia as to interpose an appreciable resistance to displacement when there is imparted thereto, through the rivet, the force of each individual hammer impact. The longéron and associated parts are sufficiently yieldable and elastic to give effect to these impacts.

In order to hold the bar 1 to the work I employ magnetic means, typified by the electromagnet 2. The poles 20 and 21 of this electromagnet are placed against the outer surface of the tube 9, adjacent the bar 1 which is inside, and in order to give unimpeded access of the hammer to the work, the points of application of the poles 20 and 21 should be removed some distance from the rivet 8. In Figure 1 both poles of the electromagnet are shown adjacent one end of the bar 2, that end which is distant from the rivet 8, but in Figure 2 the two poles have been shown at opposite sides of the rivet 8, though still removed considerably from the rivet 8.

The bar is inserted through an end of the tube 9, the rivet holes having been previously formed therein and in the gusset 90 or other piece to be connected to the tubing, and a rivet 8 is inserted through such holes. The rivet may be inserted before or after insertion of the bar 1. To hold the bar in place the electromagnet is applied outside the tubing, and the magnetic force passes through the tubing, of non-magnetic material, and attracts the bar 1, holding it against the hidden or inner side of the tubing and against the rivet 8. Now the riveting tool 7 is applied to the exterior rivet head, pressing the parts to be joined closely together, and as the hammer operates it applies a succession of riveting blows to the rivet; since the rivet head is tight against the gusset, the latter and the longéron will yield slightly. Each of these blows is communicated through the rivet to the bar 1, and accordingly the bar 1 tends to be displaced, but the bar is attracted so strongly by the electromagnetic force that, in effect, the bar reacts by inertia against the inner end of the rivet, and tends to upset it.

The bar may separate slightly from the rivet end under the influence of the hammer's blow, and is brought back by the magnetic force, as is exaggeratedly indicated in the dash lines of the drawing, and should not be of a length to attain a periodicity equal to that of the hammer blows. However, it is not the rebound which heads the rivet, but rather the static inertia of the mass resisting displacement under the force of the hammer blow, transmitted through the rivet, and reacting upon the inwardly projecting end thereof.

Duralumin, the material largely used in airplane construction, is non-magnetic, and hence all the magnetic attraction will be supplied through the duralumin, and will take effect upon the iron bar inside the tubing.

What I claim as my invention is:

1. Apparatus for heading rivets within hollow tubing comprising a magnetically attracted mass of a size and shape adapted to be inserted within the tubing to contact with the inwardly projecting end of a rivet passing therethrough, and of large moment of inertia as compared to the rivet, and electromagnetic means adapted to be placed outside of the tube adjacent the inserted mass to attract the same through the tube, wherefore the inertia of the mass resisting displacement when riveting blows are struck against the outer end of the rivet will upset the inner end of such rivets.

2. Apparatus for heading rivets comprising a magnetically attracted mass adapted to be disposed against one side of the work in contact with the end of a rivet projected through the work from the opposite side or working face thereof, and of large moment of inertia as compared to the rivet, and magnetic means adapted to be placed against the working face of the work adjacent the mass to attract the same through the work, wherefore the inertia of the mass resisting displacement under the influence of riveting blows struck against the end of the rivet at the working face will upset the opposite end of such rivets.

ERNEST P. DEAN.